United States Patent
Siddiqui et al.

(10) Patent No.: US 7,696,716 B2
(45) Date of Patent: Apr. 13, 2010

(54) DUAL BATTERY VEHICLE ELECTRICAL SYSTEMS

(75) Inventors: Muhammad A. Siddiqui, Wickford (GB); Mark Conen, Newmarket (GB); Paul Taberham, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 329 days.

(21) Appl. No.: 11/167,481

(22) Filed: Jun. 27, 2005

(65) Prior Publication Data

US 2005/0285559 A1    Dec. 29, 2005

(30) Foreign Application Priority Data

Jun. 29, 2004    (GB) ................... 0414513.2

(51) Int. Cl.
    *H02J 7/14*        (2006.01)
(52) U.S. Cl. ...................... 320/104; 320/103
(58) Field of Classification Search ................ 320/104, 320/103, 116, 117, 119, 21, 123
    See application file for complete search history.

(56) References Cited

U.S. PATENT DOCUMENTS

| | | | |
|---|---|---|---|
| 5,221,861 A | 6/1993 | Kinsell | |
| 5,455,463 A | 10/1995 | Langnickel | |
| 6,313,546 B1 | 11/2001 | Nishimura | |
| 6,731,021 B1 | 5/2004 | Urlass | |
| 6,794,848 B2 * | 9/2004 | Shinada et al. | 320/104 |
| 6,838,858 B2 | 1/2005 | Berneis | |
| 6,923,676 B2 * | 8/2005 | Perry | 439/500 |

(Continued)

FOREIGN PATENT DOCUMENTS

DE    40 28 242 A1    3/1992

(Continued)

OTHER PUBLICATIONS

Foreign Search Report dated Oct. 18, 2004.

(Continued)

*Primary Examiner*—Bao Q Vu
*Assistant Examiner*—Nguyen Tran
(74) *Attorney, Agent, or Firm*—Frank A. MacKenzie; Brooks Kushman P.C.

(57) ABSTRACT

The invention provides a dual battery electrical switchable system 2 for a vehicle having an engine. The vehicle comprises a plurality of first loads 8 and a plurality of second loads 10. The vehicle is switchable between an ON state in which the engine is running, an OFF state in which the engine is not running and a START state, in which at least one of the first loads 8 requires power. The system 2 comprises a first battery 4 arranged to provide power to the first loads 8 and a second battery 6 arranged to provide power to the second loads 10. A switch 18 is provided between the first battery 4 and the second battery 6 and control means 20 is arranged to open the switch 18 only when the vehicle is in the OFF state. A connection system 12 is also provided having a plurality of output terminals 16 for connection to the plurality of primary and secondary loads 8, 10, and two input terminals 14 for connection to the first and second batteries 4, 6 respectively.

19 Claims, 1 Drawing Sheet

U.S. PATENT DOCUMENTS

2001/0026144 A1* 10/2001 Boberschmidt et al. ..... 320/122
2004/0164705 A1* 8/2004 Taniguchi .................. 320/104
2005/0029867 A1 2/2005 Wood

FOREIGN PATENT DOCUMENTS

| DE | 100 14 243 A1 | 10/2001 |
| GB | 2385471 | 8/2003 |
| WO | 03023936 | 3/2003 |

OTHER PUBLICATIONS

Translation of page citing art in an Office Action from German Patent and Trademark Office (no date on translation).

* cited by examiner

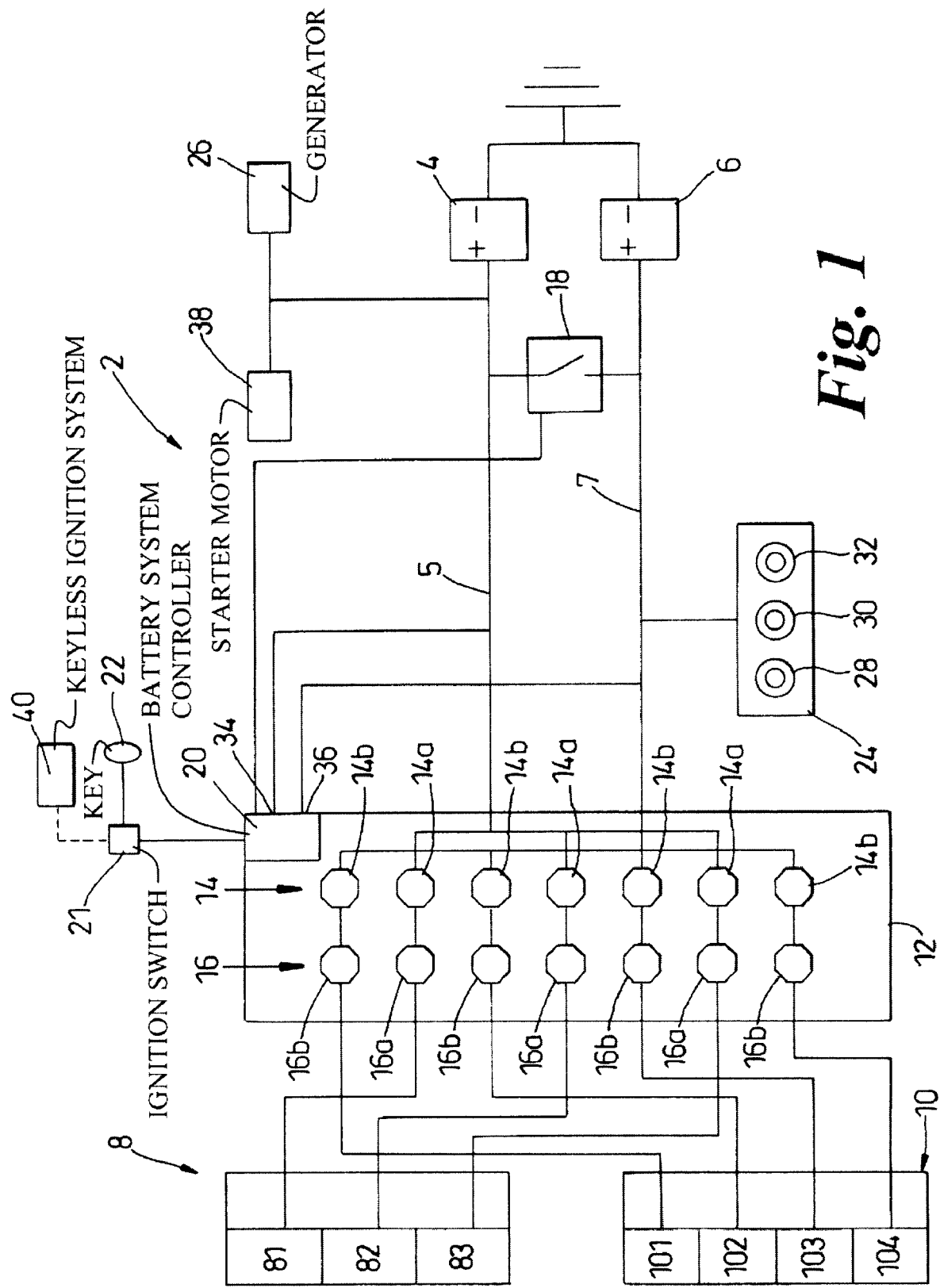

DUAL BATTERY VEHICLE ELECTRICAL SYSTEMS

The present invention relates to dual battery electrical systems for vehicles.

In modern vehicles a large number of electrical loads are required to be powered by one or more batteries of the vehicle. These loads generally include a starter motor used to crank the engine and may include other systems whose operation is essential for starting the vehicle, such as security systems and the engine management system. It is clearly undesirable for the battery or batteries to be drained by powering other loads such as the radio, lights, phone charger or in car entertainment systems when the vehicle ignition is off so that when the vehicle needs to be started, the battery does not have enough power to drive the starter mechanism. In order to avoid this situation, it is known to have a dual battery system in which two batteries are used to start a vehicle—one of the batteries being dedicated to the starter mechanism. The dedicated starter battery is switched off after it is used such that it is not in use once the vehicle has been started. Therefore the power of the battery dedicated solely to the starting mechanism is not available to power any other load whilst driving The present invention provides a dual battery electrical system for a vehicle having an engine, the system comprising a plurality of primary loads and a plurality of secondary loads and being switchable between an 'ON' state in which the engine is running, an 'OFF' state in which the engine is not running and a START state in which the primary load requires power to start the engine, the system comprising a first battery arranged to provide power to the primary load, a second battery arranged to provide power to the secondary loads, switch means changeable to connect the first battery to the second battery, such that both batteries can provide power to both primary and secondary loads, control means arranged to open the switch means when the system is in the OFF state and to close the switch means when the system is in the ON state and the START state, and a connection system having a plurality of output terminals for connection to the plurality of primary and secondary loads and two input terminals for connection to the first and second batteries respectively.

The primary load may be a starter motor, a security system, a fuelling system, or any system that controls access to the vehicle or starting of the vehicle.

Where the primary load is a starter motor the start state may be an engine crank state in which the engine is cranked by a starter motor. Alternatively, where the primary load is another load essential for starting the vehicle, such as the vehicle security, fuelling, or engine management system, the start state may not include cranking the engine.

An embodiment of the present invention will now be described by way of example only with reference to the accompanying drawing which is a schematic diagram of a dual battery system according to the invention.

Referring to FIG. 1, a dual battery electrical system 2 for a vehicle engine comprises a first battery 4 for powering primary loads 8 and a second battery 6 for powering secondary loads 10. The system 2 further comprises a connector system 12 via which the batteries 4, 6 are connected to their respective loads 8, 10. The primary loads 8 are essential for starting the vehicle and comprise a fuelling system 81, an engine management controller 82 and a security system 83. The secondary loads 10 comprise lights (interior and exterior) 101, a DVD player 102, an in-car entertainment system 103 and a mobile phone charger 104. A series of input terminals 14 and output terminals 16 are provided within the connector system 12. A first group of the input terminals 14 is connected via a primary circuit bus bar 5 to the first battery 4 and a second group of the input terminals 14 is connected via a secondary circuit bus bar 7 to the second battery 6. A first group 16a of the output terminals 16 are connected to respective primary loads 8 and a second group 16b of the output terminals 16 are connected to respective secondary loads. Each of the primary input terminals 14a is connected to a respective one of the primary output terminals 16a and each of the secondary input terminals 14b connected to a respective one of the secondary output terminals 16b. The electrical system is therefore effectively divided into a primary circuit comprising the first battery 4 and the primary loads 81, 82, 83 and a secondary circuit comprising the second battery 6 and the secondary loads 101, 102, 103, 104.

A relay switch 18 is connected between the positive terminals of the first 4 and the second 6 batteries. A battery system controller 20 is arranged to control operation of the relay switch 18. An ignition switch 21 operated by a key 22 is provided to control the vehicle ignition system and is connected to the battery system controller 20. The system 2 further comprises a number of customer connection points 24 connected to the secondary circuit bus bar 7 and a generator 26 connected to the positive terminal of the first battery 4 and arranged to charge the batteries 4, 6 as described in further detail below.

The customer connection points 24 are arranged for powering loads chosen by the user and include a cigarette lighter 28, mobile phone charger 30 and a further socket 32 for connection to general loads such as an electric fan.

The negative terminals of the first battery 4 and the second battery 6 are connected to a common electrical ground. The ignition switch 21 is user operated via the key 22 which is manually operable by a user of the vehicle to start the engine. The ignition switch 22 can be in one of three known positions corresponding to an ON state, an OFF state, and a START state which is used when a user needs to turn the system from its OFF to its ON state and start the vehicle engine.

In use, when the system 2 is initially in its OFF state the controller 20 is arranged to open the relay 18 thereby disconnecting the primary and secondary circuits from each other. The second battery 6 is able to provide power to the secondary loads 10 e.g. the interior/exterior lights 101, DVD player 102, in car entertainment system 103 or mobile phone charger 104, but these loads will not use power from the first battery 4.

The first battery 4 is able to provide power to the primary loads 8—but there is no significant amount of power required by any of these loads 8 while the system is OFF. The engine management controller 82 and security load 83 use only a very small amount of power. Whilst the system is OFF, the relay switch 18 is open such that the first battery 4 does not supply power to the secondary loads 10 and the second battery 6 does not provide power to the primary loads 8. In this way, there is no significant power demand on the first battery 4 whilst the vehicle engine is off and therefore the first battery 4 will retain sufficient power to supply the starter motor 38 when it is eventually required to start the engine. If the secondary loads 10 are used while the system is OFF, power is supplied to these by the second battery 6 only.

When a user wishes to start the vehicle engine, the key 22 is moved to the start position and this operation is detected by sensors in the ignition switch 21. The battery system controller 20 receives a signal from the sensors to inform it that the vehicle engine is to be started. The battery system controller 20 sends a signal to close the relay switch 18 and then to operate the starter motor 38 just afterwards.

Therefore as the starter motor 38 is first operated, the first battery 4 and the second battery 6 are both able to supply power to the starter motor 38. Since the relay switch 18 has been open until the starter motor 38 requires power, at least the first battery 4 will be able to provide enough power to operate the starter motor 38. Once the vehicle engine has been started and the ignition key 22 is move to the ON position, the battery system controller 20 is arranged to keep the relay switch 18 closed such that both the first battery 4 and the second battery 6 continue to provide power to the primary loads 8 and the secondary loads 10. Whilst the vehicle engine is running, the generator 26 recharges the first battery 4 and the second battery 6 in a standard manner. Advantageously, the battery system controller 20 is arranged to keep the relay switch 18 closed while the vehicle engine is running and thus both the first battery 4 and the second battery 6 are recharged by the generator 26. Also the batteries are connected together so that they are both able to power any loads.

The battery system controller 20 has a further inputs 34, 36 connected to the positive terminal of the first battery 4 and the second battery 6 so that it can detect the output voltage of both batteries. If the output voltage of the second battery 6 is below that of the first battery 4, the controller 20 is arranged not to close the relay switch 18 on starting. This is to ensure that the power of the first battery 4 does not go towards recharging the second battery 6 instead of operating the starter motor 38—which is obviously undesirable. In other embodiments the battery system may not include these further sensors.

When the user requires the vehicle engine to be turned off, the key 22 is turned to the OFF position which is sensed by the battery system controller 20. When the vehicle engine is turned off, the controller 20 opens the relay switch 18 once more such that the first battery 4 is not able to supply power to the secondary loads 10. In this way the first battery 4 is dedicated solely to powering the primary loads 8 (which do not consume any significant amount of power whilst the vehicle engine is off). Therefore there is always enough power available to operate the starter motor 38 and other primary loads and thus start the vehicle engine when required.

The connections within the connection box can be modified relatively easily so that different loads are connected to primary and secondary circuits. This makes it easy during manufacture of the dual battery system 2 for any particular load to be assigned as a first primary 8 or a secondary load 10. Primary loads 8 will be carefully chosen such that when the vehicle engine is off they do not consume much power and therefore power is retained in the first battery 4 for whenever the vehicle engine is required to be turned on.

In a modification to the embodiment described above, instead of the ignition switch 21 being key operated by the key 22, it is controlled by a keyless ignition system 40. This can be operated by a swipe card or by entry of a security code into a keypad. The keyless ignition system switches between three states in the same way as the keyed ignition system. Each state can be selected manually by the driver, or the system may be arranged to switch between the start state and the on state without driver input, so that the driver only needs to provide one input to start the vehicle.

Various modifications may be made to the present invention without departing from its scope. For example, many different types of loads may be powered by the first battery and the second battery. For example, the primary loads may include fuel system loads, anti-theft devices and other known low energy loads. The secondary loads may include radio, fog lights, drinks coolers and any other known similar loads. More than two batteries may be provided in this arrangement, as long as one battery is reserved for use with the starter load and is not significantly drained when the vehicle engine is off.

The invention claimed is:

1. A dual battery electrical system for a vehicle having an engine, the system comprising:
a plurality of primary loads and a plurality of secondary loads and being switchable between an ON state in which the engine is running, an OFF state in which the engine is not running and a START state in which at least one of the primary loads requires power to start the engine;
a first battery arranged to provide power to the primary loads;
a second battery arranged to provide power to the secondary loads;
switch means closeable to connect the first battery to the second battery, such that both batteries can provide power to both loads, control means arranged to open the switch means when the system is in the OFF state and to close the switch means when the system is in the ON state and the START state; and
a connection system having a plurality of output terminals for connection to the plurality of primary and secondary loads and two input terminals for connection to the first and second batteries, respectively, wherein the plurality of primary loads are electrically disconnected from the plurality of secondary loads in the START state when the voltage charge of the second battery is less than the voltage charge of the first battery.

2. The battery system of claim 1, further comprising a generator arranged charge the first and second batteries when the assembly is in the ON state.

3. The battery system of claim 1, in which the at least one primary load comprises a starter motor arranged to be powered to start the vehicle when the system is in the START state.

4. The battery system of claim 3, in which the control means is arranged to close the switch means before commencing operation of the starter motor.

5. The battery system of claim 1, further comprising a user operated ignition switch in communication with the control means to switch the system between the three states.

6. The battery system of claim 1, in which the first battery is connected to the primary loads to form a primary circuit and the second battery is connected to the secondary loads to form a secondary circuit, such that opening the switch means separates the circuits from each other electrically.

7. The battery system of claim 1, in which the plurality of primary loads comprises one or more of an engine management controller, a security load and a fuelling system.

8. The battery system of claim 1, in which the plurality of primary loads comprises low consumption loads such that the first battery retains enough power to drive the primary loads when the system is in the START state.

9. The battery system of claim 1, in which the plurality of secondary loads comprises one or more of interior lights, exterior lights, a radio, customer load connection points, a lighter, a mobile phone charger, tail lights, a DVD player, an in car entertainment system, a drinks cooler and other accessories.

10. The battery system of claim 1, in which the control means is further arranged to sense the output voltage of the second battery, wherein the control means is arranged to open the switch means only if the second battery output voltage is above a predetermined value.

11. A vehicle electrical system comprising:
a first battery;
a second battery;

a set of primary loads electrically connected to the first battery by a first circuit;

a set of secondary loads electrically connected to the second battery by a second circuit;

a switch disposed between the first and second batteries;

an ignition switch having an OFF condition, an ON condition, and a START condition; and a controller for controlling operation of the switch such that the switch electrically disconnects the first and second batteries when the ignition switch is in the OFF condition; the switch electrically connects the first and second batteries when the ignition switch is in the ON condition, and the switch electrically connects the first and second batteries when the ignition switch is in a START condition and a charge of the second battery is not less than a charge of the first battery.

12. The system of claim 11 further comprising a generator electrically coupled to a positive terminal of the first battery, wherein the generator recharges the first and second batteries when the ignition switch is in the ON condition.

13. The system of claim 11 wherein the set of primary loads includes an engine starter motor and wherein the first and second batteries provide power to the engine starter motor to start an engine when the ignition switch is in the START condition.

14. The system of claim 11 wherein the set of primary loads are electrically disconnected from the set of secondary loads when the ignition switch is in the OFF condition.

15. The system of claim 11 wherein the set of primary loads are electrically disconnected from the set of secondary loads when the ignition switch is in the START condition and the charge of the first battery is greater than or equal to the charge of the second battery.

16. The system of claim 11 further comprising a connector system electrically coupled to the set of primary loads and the set of secondary loads, a primary bus bar electrically coupled to the first battery and the connector system, and a secondary bus bar electrically coupled to the second battery and the connector system.

17. The system of claim 16 further comprising a set of customer electrical connection points electrically coupled to the secondary bus bar.

18. The system of claim 17 wherein the switch is attached to the primary and secondary bus bars.

19. The system of claim 11 wherein the switch is disposed between positive terminals of the first and second batteries.

\* \* \* \* \*